United States Patent [19]

Backskog

[11] 4,255,632
[45] Mar. 10, 1981

[54] GROUNDING SWITCH FOR GAS-INSULATED HIGH VOLTAGE SWITCHGEAR

[75] Inventor: Hans Backskog, Ludvika, Sweden

[73] Assignee: ASEA Aktiebolag, Vesteras, Sweden

[21] Appl. No.: 921,184

[22] Filed: Jul. 3, 1978

[30] Foreign Application Priority Data

Jul. 8, 1977 [SE] Sweden ............................... 7707986

[51] Int. Cl.$^3$ ............................................. H01H 33/00
[52] U.S. Cl. ............................ 200/148 R; 200/153 D; 200/163
[58] Field of Search ............ 200/148 R, 148 A, 148 B, 200/148 C, 148 D, 148 E, 148 F, 148 G, 148 H, 148 J, 148 BV, 144 R, 48, 163, 144 B, 153 D, 241; 174/35 R; 339/11

[56] References Cited

U.S. PATENT DOCUMENTS

| 3,562,460 | 2/1971 | Koerner .................................. 200/163 |
| 3,806,682 | 4/1974 | Mauthe et al. ......................... 200/163 |
| 4,016,382 | 4/1977 | Roth ..................................... 200/148 R |

*Primary Examiner*—Gene Z. Rubinson
*Assistant Examiner*—Morris Ginsburg

*Attorney, Agent, or Firm*—Watson, Cole, Grindle & Watson

[57] ABSTRACT

A grounding switch for gas-insulated, metal-enclosed high voltage switchgear in which a movable switch contact, in permanent connection with the grounded enclosure of the switchgear, and a movable counter contact at high potential, mounted on at least one phase conductor of the switchgear, are moved relatively into respective OFF and ON-positions by an operating device, with the movable switch contact in non-contacting and contacting relationship, respectively, with the movable counter contact. A metal screen surrounds the phase conductor in the region thereof where the movable counter contact is mounted. The movable counter contact is centrally mounted in the metal screen and is displaced from the screen towards the movable switch contact during closing of the contact elements to the ON-position. The movable counter contact is retracted within the screen in the OFF-position. The movable counter contact includes an elevated portion for enhancing the control of flashover such that it occurs between the movable switch contact and the elevated portion. In a modified embodiment the movable counter contact is independently operated by a second operating device, but in synchronism with the operation of the first operating device.

7 Claims, 6 Drawing Figures

INDEPENDENT OPERATING DEVICE

GROUNDING SWITCH FOR GAS-INSULATED HIGH VOLTAGE SWITCHGEAR

BACKGROUND OF THE INVENTION

1. Field of the Invention

The present invention relates to grounding switches for gas-insulated high voltage switchgear, and more particularly to metal-enclosed high voltage switchgear utilizing a grounding switch.

2. Prior Art

In gas-insulated high voltage switchgears, grounding switches of two types are used, namely, slow operating switches and fast grounding switches with closing capacity. The invention relates to a grounding switch of the latter design, in which a movable contact is positioned in a mechanism on the grounded enclosure and is driven, for example, by a spring-operated closing device to provide contact with a counter contact at high potential. Such a fast grounding switch should be capable of grounding the high voltage parts also when voltage is applied to them, due to some error, during a closing operation. In the event of such a switching operation, the contacts are exposed to full short-circuit current. To be able to cope with the closing operation without causing contact welding or mechanical damage, the movable contact operates at a high speed and the contacts have an appropriate shape.

FIG. 1 schematically shows a previously known embodiment of a grounding switch of the kind mentioned. High voltage conductor 2 (the main current path) is supported by insulator 3 in grounded metal enclosure 1. Fixed contact 4 (the counter contact) of the grounding switch is arranged on conductor 2, and consists of a sleeve contact with surrounding metal screen 5. Movable contact 6 is in permanent connection with grounded enclosure 1 and is operated by operating device 7. The closing operation is performed by a known spring mechanism and is very quick, whereas the opening operation is performed by means of a motor, or manually, and is relatively slow.

In a closing operation, when movable contact 6 approaches counter contact 4, a flash-over occurs (FIG. 2) and burn damage A occurs in the zone around counter contact 4 (FIG. 3). Such burn damage may considerably reduce the insulating resistance of the switchgear. For voltages up to 300 to 400 kV the extent of the flash-over is about 30 to 50 mm, and the parts around the counter contact can then be designed so that no harmful damage to the voltage stability of the switchgear occurs. At higher voltages (500–800 kV) the flash-over distance is considerably greater and the zone on which damage may occur due to a random flash-over increases rapidly.

SUMMARY OF THE INVENTION

The primary purpose of the present invention is to provide a grounding switch which is designed so that full insulating resistance is maintained after closing the switch against voltage. This is achieved by a counter contact that comprises a movable contact element centrally arranged in a fixed metal screen such that upon closing of the grounding switch, the movable contact element is displaced from the screen towards the movable switch contact, and in the OFF-position the movable contact element is retracted into the screen.

The inventive concept enables the insulating resistance to be maintained with both the movable counter contact element and the movable switch contact withdrawn. During a closing operation a flash-over is certain to occur because of the operating voltage used, which is of a considerably lower value. To control the flash-over, both the movable counter contact element and the movable switch contact are moved towards each other and at the tips of the movable counter contact element there are formed field strength elevations which initiate the flash-over and guides it between the movable switch contact and the movable counter contact element.

BRIEF DESCRIPTION OF THE FIGURES

The above features and advantages of the invention, as well as the manner in which it is carried out, are apparent from the following description taken in conjunction with the various Figures, wherein.

DETAILED DESCRIPTION

Figure 1:
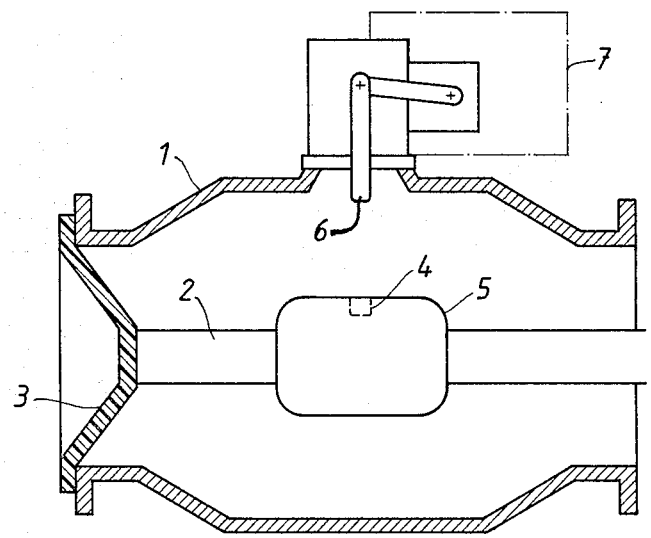
FIG. 1 shows a prior art high voltage grounding switch.
Figure 2:
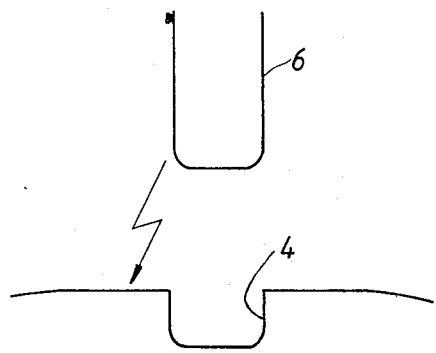
FIGS. 2 and 3 respectively illustrate the flash-over between the movable switch contact and the fixed counter contact, and the effects of burning on the switchgear screen, of the prior art apparatus.
Figure 3:
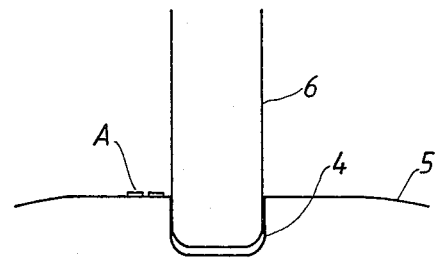
Figure 4:
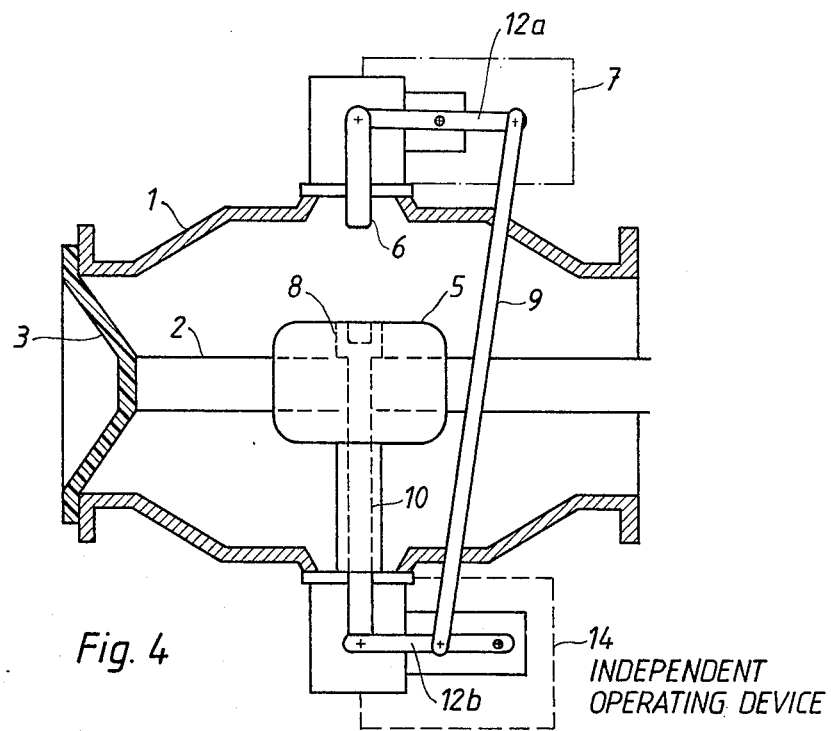
FIG. 4 shows an exemplary embodiment of the switchgear of the present invention.
Figure 5:
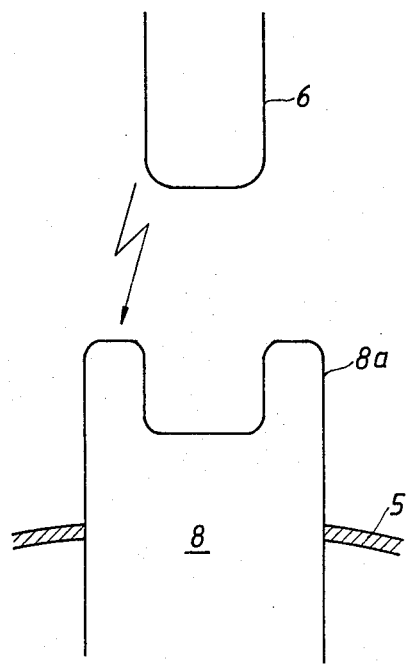
FIGS. 5 and 6 respectively illustrate the flash-over between the movable switch contact and the elevated tip of the movable counter contact element and the effects of flash-over for the embodiment of FIG. 4.
Figure 6:
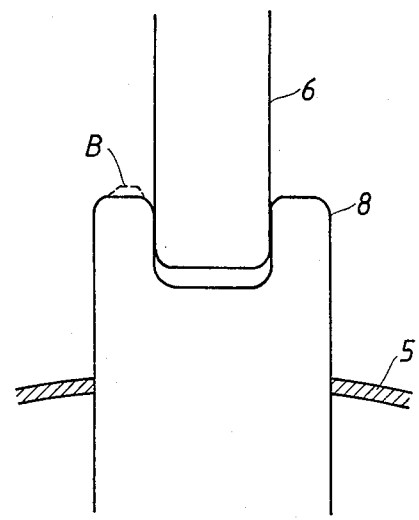

In the grounding switch shown in FIG. 4, movable counter contact 8 (or a contact part surrounding that element) is axially displaceable and operated by operating device 7 for operating movable contact 6 via external mechanism 9 and insulating pull rod 10. In a closing operation, movable counter contact 8 is moved outwardly from protecting screen 5 simultaneously with the closing operation of contact 6. When movable switch contact 6 has reached the position in which a flash-over may occur, movable counter contact 8, which has been extended beyond the surface of screen 5, has disturbed the field configuration and acquired increased field strength, and therefore there is a flash-over between movable switch contact 6 and movable counter contact 8 as shown in FIG. 5. The burn damage B (FIG. 6) which then occurs does not affect the insulating resistance of the switchgear in the opened position thereof since both movable switch contact 6 and movable counter contact 8 are retracted to positions with a lower field strength.

Elevated portions 8a, projecting from movable counter contact 8 towards movable switch contact 6, serve to control flash-over by altering the field strength in the region of the tip portion of movable counter contact 8, such that flash-over occurs between movable switch contact 6 and elevated portions 8a, rather than between the movable switch contact and metal screen 5 as in prior art switchgear apparatus.

Movable counter contact 8, which is operated by insulating rod 9, has a suitable speed relative to movable switch contact 6, and preferably in the range of at least 0.25 to at most 1.0. This is diagrammatically depicted in FIG. 4 by the relative difference in the effective fulcrums of levers 12a and 12b. Movable switch contact 6 is operated from the enclosure side of the switchgear.

The invention is not limited to the embodiment shown, for example, the movable counter contact does not necessarily have to be operated by a pull rod which is located right in front of the movable switch contact 6 and with its movements controlled by external linkage 9 as shown in FIG. 4. Movable counter contact 8 may alternatively be provided with a spring operating device of its own, or pull rod 10 could also be replaced with a lever or a torsion rod, as represented in FIG. 4 by independent operating device 14, shown in dashed lines therein.

What is claimed is:

1. Grounding switch in combination with a gas-insulated, metal-enclosed, high voltage switchgear, comprising:
    a movable switch contact in permanent connection with a grounded enclosure of the switchgear;
    at least one phase conductor;
    a movable counter contact permanently connected to said at least one phase conductor;
    a metal screen surrounding said phase conductor in the region of said movable counter contact;
    a first operating device for displacement of said movable switch contact between an OFF-position and an ON-position for grounding said switchgear, with said movable switch contact in non-contacting and contacting relationship with said movable counter contact, respectively in said OFF-position and said ON-position;
    said movable counter contact is centrally mounted in said metal screen, and being arranged, upon closing of said movable switch contact to said ON-position, to be displaced from said screen towards said movable switch contact, said movable counter contact being retracted within said screen in said OFF-position.

2. The combination according to claim 1 wherein said movable counter contact includes an elevated portion extending towards said movable switch contact, such that flash-over occurs between said movable switch contact and said elevated portion.

3. The combination according to claim 1, further comprising a linkage mechanism for connecting said movable counter contact to said first operating device.

4. The combination according to any of claims 1, 2 or 3 wherein said first operating device displaces said movable counter contact during the closing operation at a speed of 0.25 to 1 times the speed of said movable switch contact.

5. The combination according to claim 1, further comprising a second operating device for operating said movable counter contact in synchronism with said first operating device.

6. The combination according to claim 5 wherein said movable counter contact includes an elevated portion extending towards said movable switch contact, such that flash-over occurs between said movable switch contact and said elevated portion.

7. The combination according to claims 5 or 6 wherein said second operating device displaces said movable counter contact during the closing operation at a speed of 0.25 to 1 times the speed of said movable switch contact.

* * * * *